April 21, 1970 HIROSHI HAKATA ET AL 3,508,061

PHOTOELECTRIC APPARATUS FOR TRACKING A MOVING OBJECT

Filed June 30, 1967

7 Sheets-Sheet 1

INVENTORS
H. HAKATA
K. MAEDA
K. HIGUCHI

BY Wenderoth, Lind & Ponack
ATTORNEYS

INVENTORS
H. HAKATA
K. MAEDA
K. HIGUCHI

BY Wenderoth, Lind & Ponack
ATTORNEYS

PHOTOELECTRIC APPARATUS FOR TRACKING A MOVING OBJECT

Filed June 30, 1967 7 Sheets-Sheet 3

INVENTORS
H. HAKATA
K. MAEDA
K. HIGUCHI

BY Wenderoth, Lind & Ponack
ATTORNEYS

INVENTORS
H. HAKATA
K. MAEDA
K. HIGUCHI

BY *Wenderoth, Lind & Ponack*
ATTORNEYS

INVENTORS
H. HAKATA
K. MAEDA
K. HIGUCHI

BY Wenderoth, Lind & Ponack
ATTORNEYS

PHOTOELECTRIC APPARATUS FOR TRACKING A MOVING OBJECT

Filed June 30, 1967 7 Sheets-Sheet 6

INVENTORS
H. HAKATA
K. MAEDA
K. HIGUCHI

BY Wenderoth, Lind & Ponack
ATTORNEYS

INVENTORS
H. HAKATA
K. MAEDA
K. HIGUCHI

BY Wenderoth, Lind & Ponack
ATTORNEYS 3,508,061

PHOTOELECTRIC APPARATUS FOR TRACKING A MOVING OBJECT

Hiroshi Hakata, Nara-shi, Keizo Maeda, Itami-shi, and Katsumi Higuchi, Osaka-shi, Japan, assignors to Shionogi & Co., Ltd., Osaka, Japan Filed June 30, 1967, Ser. No. 650,541
Claims priority, application Japan, July 4, 1966, 41/43,671
Int. Cl. G01j *1/20;* G01p *3/36*
U.S. Cl. 250—203 6 Claims

ABSTRACT OF THE DISCLOSURE

A photoelectric apparatus for tracking a moving object in order to measure the various factors of its movement, which apparatus is composed of a parallel elongated light source and a traveling line of a light receiving means. The moving object is held between the source and the receiving means. Said light receiving means, which can move along said traveling line to track and measure the movement of said object, also serves to detect its own tracking error components by means of the variation in photoelectric current which is then utilized to correct the value of said measurement.

BACKGROUND OF THE INVENTION

Field of the invention

The present invention generally relates to an apparatus which is designed to track a moving object photoelectrically in order to detect its displacement or other variates, such as, its velocity, its acceleration or the integrated distance of the object's travel. Particularly it concerns a photoelectric apparatus capable of measuring such variates with excellent accuracy.

Description of the prior art

Since such measurements have occasionally been required in the field of measurement and control, a variety of methods for measuring variates of moving objects have been put into practice in the past.

Among these, methods utilizing a photoelectric system have frequently been employed in those cases where there has been a special need for leaving the object intact while making the measurement.

Leading methods thereof are:

(1) A photoelectric automatic tracking (follow up) system.

(2) A system for detecting the variance of the incident light.

An illustrative example of the former system is an apparatus in which a servo mechanism is provided which comprises, on both sides of a moving object, a horizontal elongated light source and a corresponding light receiving means which is capable of traveling on a line substantially parallel to the elongated light source. Such an arrangement allows the light receiving means to track the peripheral portion of the object where it is partly shaded from the incident light by the object.

An apparatus so constructed, although having the advantage of enabling the detection of a large displacement of the object by designing the light receiving means to allow a wide range of travel, cannot always attain an accurate tracking performance. An error is sometimes inevitable if the object is moved rapidly because the light receiving means sometimes fails to respond to such a sudden change.

Conversely, the latter system namely a system for detecting the variance of the incident light, will detect the variance of the light incident upon the light receiving means caused by the shading thereof by the moving object and will have a quick response (although, it is unavoidably qualified by the characteristics of the photoelectric element employed). It has the advantage of enabling the detection of a sudden variation in the motion of the moving object. However, detection is very difficult to attain over a wide range by this system. Its application is restricted to these cases where the displacement of the moving object is not much greater than its width.

As previously described, each of these systems has its inherent advantages and drawbacks. The present invention obviates the drawbacks while retaining the advantages of these systems. This invention provides an improved photoelectric tracking apparatus which has accurate sensing characteristics.

SUMMARY OF THE INVENTION

The principal object of this invention is to provide an apparatus for measuring the velocity, acceleration, distance moved and displacement of a moving object. These objectives are accomplished by measuring the action of the light receiving means mounted on the tracking means. Said method compensates almost perfectly for the responding errors caused by the inertia of the light receiving means.

Brief description of the drawings

Other object and the attendant advantages of this invention will be better understood from the following detailed illustration of an embodiment taken in connection with the accompanying drawings in which.

DESCRIPTION OF THE PREFERRED EMBODIMENT

To begin with, the features of the previously-mentioned conventional systems, which are partly incorporated into the present invention, must be illustrated in more detail.

Figure 3A:
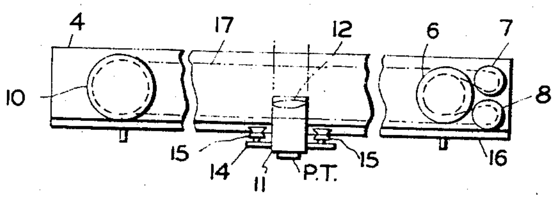
FIGS. 3*a*–3*c* are, respectively, a plan view, a front view and a side view of the automatic tracking means illustrated in FIG. 1.
Figure 3B:
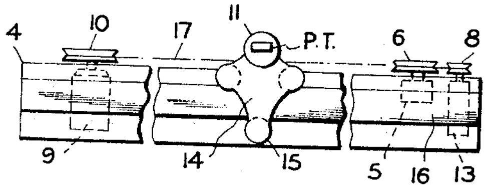
Figure 3C:
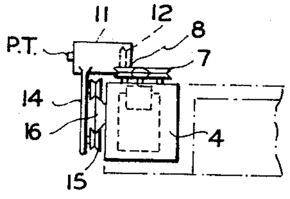
Figure 4:
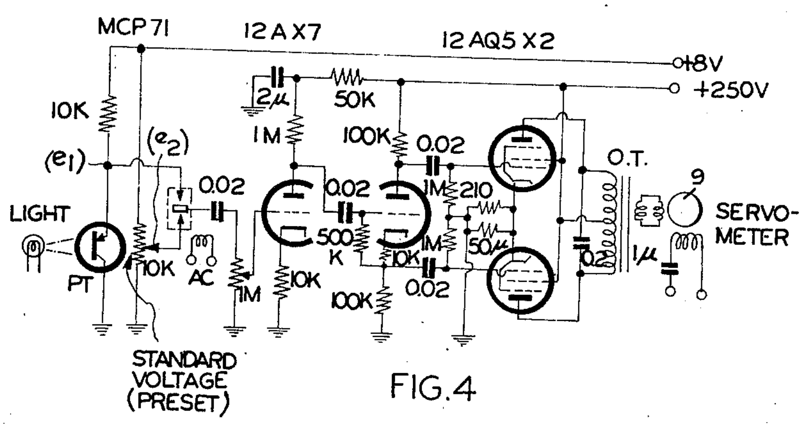
FIG. 4 is a circuit diagram of means for driving the automatic photoelectric tracking means illustrated in FIGS. 1 and 3.
Figure 5:
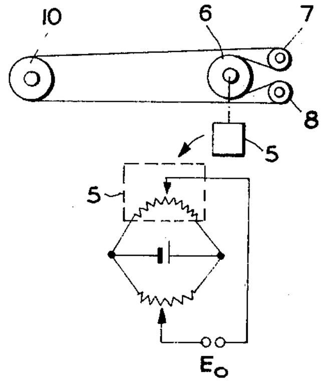
FIG. 5 is an explanatory diagram of the displacement signal output circuit of the automatic tracking means illustrated in FIGS. 3*a*–3*c* and 4.

The apparatus illustrated in FIG. 3 (tracking means), FIG. 4 (electric circuit for driving the tracking means) and FIG. 5 (output circuit for displacement signal) are examples of parts of the former system described above in which a servomotor 9 having a grooved pulley 10 is mounted on one end of the frame 4 of the apparatus. A potentiometer 5 having a grooved pulley 6, a tachogenerator 13 having a grooved pulley 8 and a freely rotatable guide pulley 7 are mounted on the other end of the frame 4 of the apparatus.

The light receiving means 11 includes a lens 12 and a phototransistor PT disposed in such a relationship that the light through the lens can focus on the light receiving surface of the phototransistor. It is fixed to a support 14, having grooved wheels 15, 15' and 15'' which engage a guide plate 16 mounted on the side face of the frame 4.

Figure 1:
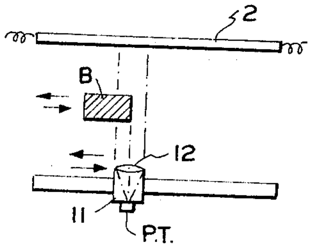
FIG. 1 is an explanatory diagram of the conventional photoelectric, automatic tracking system.

An endless wire 17, both ends of which are connected to the light receiving means 11, engaged with the grooved pulleys 6, 7, 8 and 10 in such a way that the rotation of the servomotor 9 cause the traveling of the wire 17 which accompanies the displacement of the light receiving means 11 as well as the rotation of the potentiometer 5 and the tachogenerator 13. The tracking means thus comprised is disposed as represented in FIG. 1, wherein the light receiving means 11 of the apparatus receives the light from the elongated light source 2. The range of the receiving light is determined by a parallel beam having a cross section which is substantially equal to the aperture of the lens 12 as indicated by the dotted lines of FIGS. 1 and 3. In this apparatus, the output current of the phototransistor will be at its maximum value when the light beam from the elongated light source is uninterrupted. Conversely, the current will fall to its minimum value when the light receiving means is completely covered. Consequently, it is obvious that the output current of the phototransistor will show a value intermediate the above two extremes when the object stands in a position where it partly interrupts the light directed toward the light receiving means.

Figure 6:
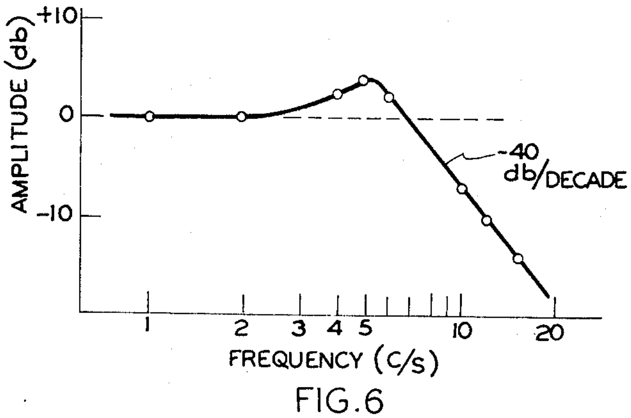
FIG. 6 is a diagram illustrating the frequency response characteristic of the conventional automatic photoelectric tracking means.

Thus, by establishing a standard value (preset value) corresponding to this intermediate value of the output current, which is made to correspond always to the preset value by responsive positioning of the light receiving means, it is possible to automatically track the object. FIG. 4 shows the diagram of an electric circuit which is designed to drive this apparatus. It functions as follows:

The difference voltage $\epsilon(=e_1-e_2)$ between the output voltage $e_1$ of the PT and the reference voltage (preset value) $e_2$ is converted into an alternating voltage by a chopper and is subsequently amplified in order to be fed to the servomotor 9 through an output transformer OT. The servomotor 9 is designed and connected in such a way that it will drive the light receiving means 11 in the direction always to decrease voltage $\epsilon$. It will stop rotating at the position where the voltage $\epsilon$ falls to zero. Thus the tracking operation is accomplished. In addition to this, since a potentiometer 5 is provided in the tracking means, tracking displacement can of course, be converted into voltage by a bridge circuit incorporating this potentiometer as illustrated in FIG. 5. The velocity thereof can likewise be detected from the output voltage of the tachogenerator 13. FIG. 6 exemplifies, for the purpose of elucidating the frequency response characteristics of the apparatus, the corresponding tracking amplitude of the light receiving means obtained by imparting a sinusoidal vibration of a constant amplitude to the moving object at various frequencies.

It is clearly seen from this result, that the tracking amplitude in the higher frequency region is decreased and that the resonance point appears at the critical region. This indicates a typical pattern where an inertia exists in the system. The pattern can be improved, to a limited extent, by a careful adjustment of the mechanical and electrical systems of the apparatus. However, it is impossible to make good improvements because the tracking errors are considered to be inevitable in the system.

Figure 2A:
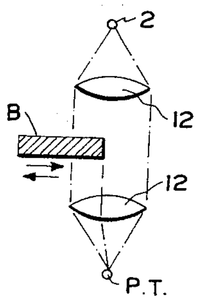
FIGS. 2*a* and 2*b* are explanatory diagrams of the conventional system for detaching the variance of the incident light.
Figure 2B:
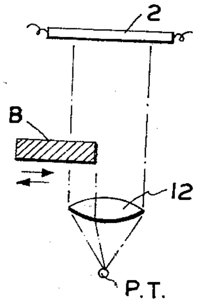
Figure 7:
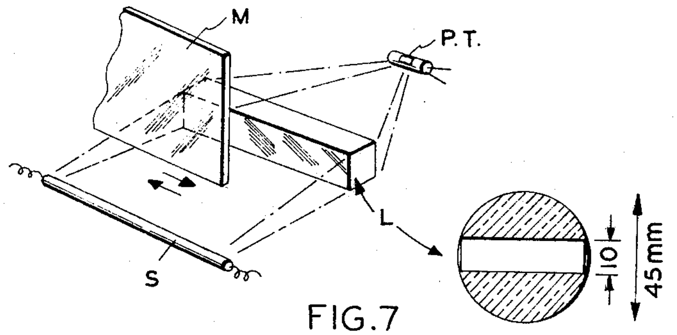
FIG. 7 is a perspective view of the apparatus to be employed in a system for detecting the variance of the incident light.
Figure 8A:
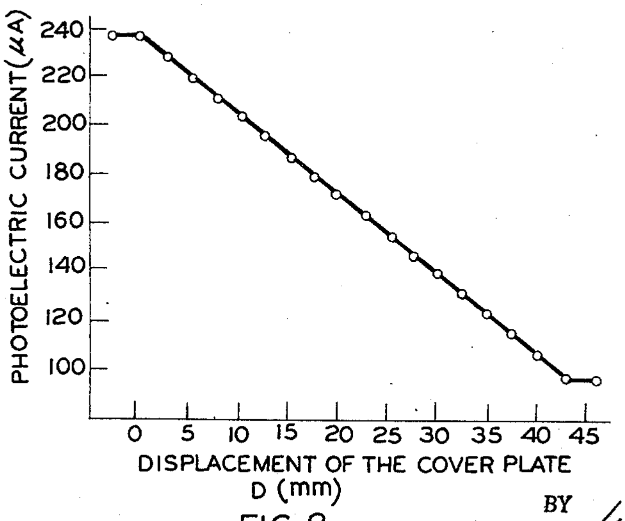
Fig. 8*a* is the characteristic curve of cover plate displacement vs. photoelectric current for the apparatus illustrated in FIG. 7.

The arrangement of an experiment carried out in accordance with the system for detecting the variance of incident light brought by the displacement of the object B as shown in FIG. 2, is illustrated in FIG. 7. The phototransistor PT is disposed in such a way that the light from the elongated light source S can focus at the photosensitive surface of the PT through the elongated lens L which is cut and shaped from a round convex lens. FIG. 8*a* illustrates the relationship between the displacement of the cover plate M, which is positioned between the lens L and the light source S, and the output current of the phototransistor PT. The photoelectric current varies in a substantially linear relationship for a displacement as large as 43 mm. Thus it is possible to correlate a reading of the photoelectric current with a proportional reading of the displacement.

Although this arrangement has an excellent frequency responding function (characteristics), which is qualified solely by the frequency response characteristics of the phototransistor mounted on the light receiving means, the linear portion of the displacement vs. photoelectric current characteristic curve is, however, limited to a small range of displacement. The only way to widen this range is by the employment of lens having a larger aperture. Moreover, since this method is applicable only in the case when the displacement of the object is less than its width, it cannot be employed in the case when a narrow object undergoes a wide displacement.

Figure 8B:
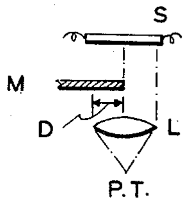
FIG. 8*b* is a diagram showing the relations between the elements of the apparatus of FIG. 7.

The present invention has a light receiving means corresponding to 11 in FIG. 3 which has a linear displacement vs. photoelectric current characteristic as shown in FIG. 8. The displacement of the object is measured by measuring the displacement of the light receiving means as it travels by means of the photoelectric automatic tracking system as described above, and the tracking error is detected by the output voltage of the phototransistor mounted on the light receiving means and the system for detecting the variance of the incident light. According to this invention the value measured by the former system is automatically corrected by the error component detected simultaneously by the latter system. The schematic diagram thereof and the circuit diagrams thereof are shown in FIG. 9 and FIGS. 10–11 respectively.

Figure 9:
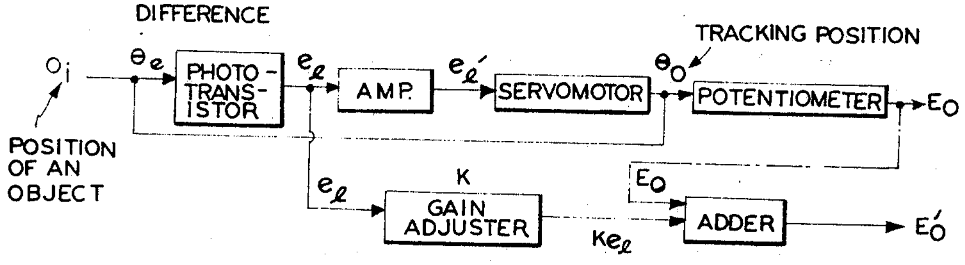
FIG. 9 is a schematic diagram of the apparatus for measuring displacement in accordance with this invention.

As is seen in FIG. 9, the phototransistor is connected to an amplifier, the output of which is coupled to the servomotor. The servomotor is coupled to a potentiometer which gives an indication of the displacement voltage $E_0$. At the same time the tracking error $e_e$ is detected by the output voltage of the phototransistor (as mentioned before) and is fed to a gain adjuster, and from there to an adder. The voltage $E_o$ from the potentiometer is also fed to the adder, which in turn combines them to produce the error corrected voltage $E_o'$.

Figure 10:
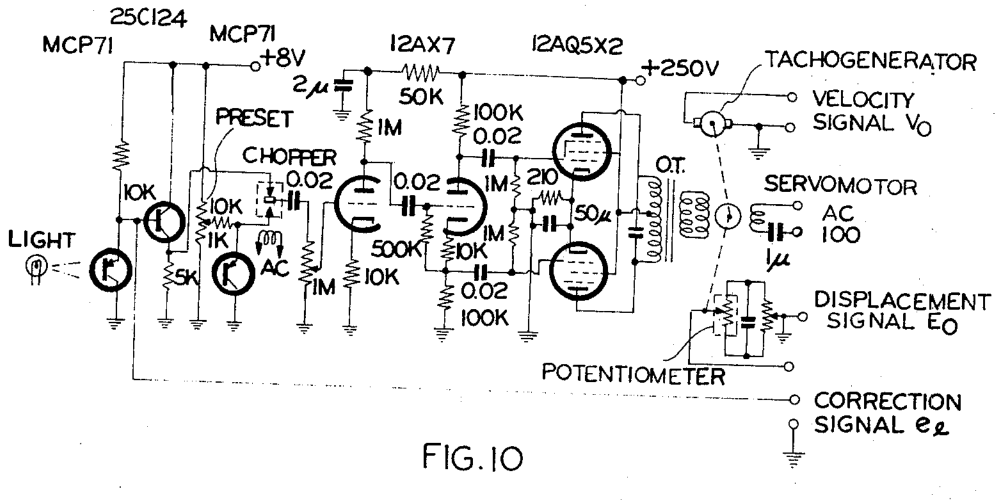
FIGS. 10 and 11 are circuit diagrams of the apparatus illustrated in FIG. 9.
Figure 11:
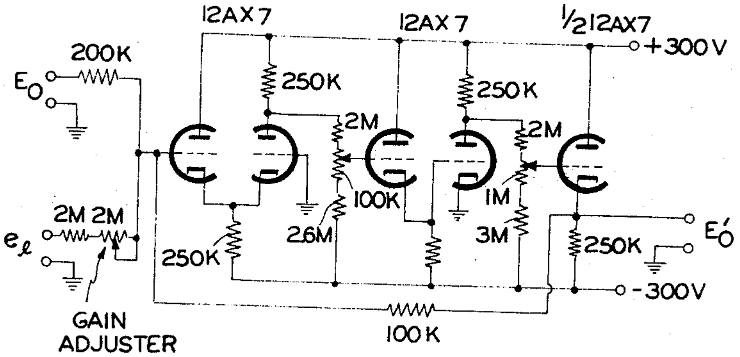

The circuit diagrams of FIGS. 10 and 11 show the actual circuits of the arrangement of FIG. 9. In FIG. 10, the phototransistor (MCP71 in the left extreme of the figure) is mounted on said light receiving means 11 in FIG. 3, and the other one (MCP71, this is covered so as not to receive light) in the reference voltage setting circuit is provided for the purpose of compensation of the thermal drift of the light receiving phototransistor (MCP. 71).

The chopper and the A.C. amplifier circuits are conventional ones which serve to drive the servomotor of this tracking apparatus (the constructions of these are similar to the circuit shown in FIG. 4).

As shown in this figure, displacement signal $E_o$ is obtained from the potentiometer coupled to the servomotor, and the correction signal $e_e$ (tracking error signal( is detected by the output voltage of the light receiving phototransistor (MCP. 71). These signal $E_o$ and $e_e$ are applied to the input terminals of the operational amplifier circuit as shown in FIG. 11 and this circuit operates as an analogue adder of $E_o$ and $e_e$.

Thus the output signal $E_o'$ of this circuit is the error corrected displacement signal.

As can easily be appreciated from the above disclosure, the tracking means comprises a servo system of the type indicated by the solid lines in FIG. 9. Said system detects and operates to minimize the difference $\theta_e$ between the input $\theta_i$ (the position of the object and the output $\theta_o$ (tracked position thereof) to zero (displacement signal voltage is picked up as the voltage $E_o$ by the potentiometer of FIG. 5).

The output voltage ($e_e$) of the phototransistor (proportional to the photoelectric current) is picked up and transformed into a voltage of suitable dimension ($Ke_e$) by the gain adjuster as indicated by the dotted line of FIG. 9. It is then added to the displacement signal voltage $E_o$ in the adder in order to obtain the output voltage with its tracking error $E_o'$ corrected. The coefficient K is a factor which defines the extent of correction of the tracking error and which can be set at its optimum value by the precise calibration of the quantitative relationship of the $E_o$ against the $e_e$ (if this value is not optimum, the correction will be either excessive or deficient).

Figure 12A:
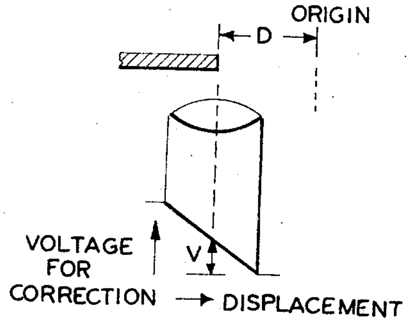
FIGS. 12*a*–12*c* are explanatory diagrams illustrating the correcting operation of the apparatus.
Figure 12B:
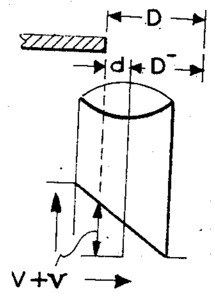
Figure 12C:
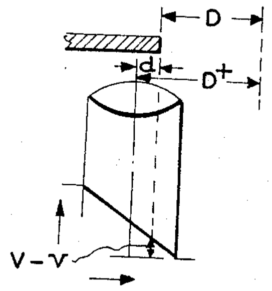

This function is diagrammatically illustrated in FIGS. 12*a–c*, in which three cases are shown; (a) is the case where there is no tracking error, (b) the case where there is a tracking error of $-d$ and (c) the case where there is a tracking error of $+d$. D represents the actual displacement of the object (from origin), and D, $D^-$ and $D^+$ each represents the displacements of the light receiving means in the cases (a), (b) and (c).

Then the actual displacements to be detected are represented by:

(a) $D=D$
(b) $D=D^-+d$ (1)
(c) $D=D^+-d$

In FIG. 12, assume that the voltage V is used to correct the error in case (a). The voltages will be $V+v$ and $V-v$ in the cases (b) and (c). The corrected results are therefore expressed as follows:

(a) $D+KV$
(b) $D^-+K(V+v)=(D^-+Kv)+KV$
(c) $D^++K(V-v)=(D^+-Kv)+KV$

Accordingly, by previous fixing of K as $d/v$, the above formulae will be:

(a) $$D+\frac{d}{v}V$$

(b) $$(D^-+d)+\frac{d}{v}V \qquad (2)$$

(c) $$(D^+-d)+\frac{d}{v}V$$

Although all of these formulae include the constant $$\frac{d}{v}V(=KV)$$

it can be removed if the origin is shifted $$\frac{d}{v}V$$

and the resulting equations will be:

(a) D
(b) $D^-+d$ (3)
(c) $D^+-d$

Therefore, the relationships in the Equations (1) are satisfied and the error correction is automatically performed.

Figure 13:
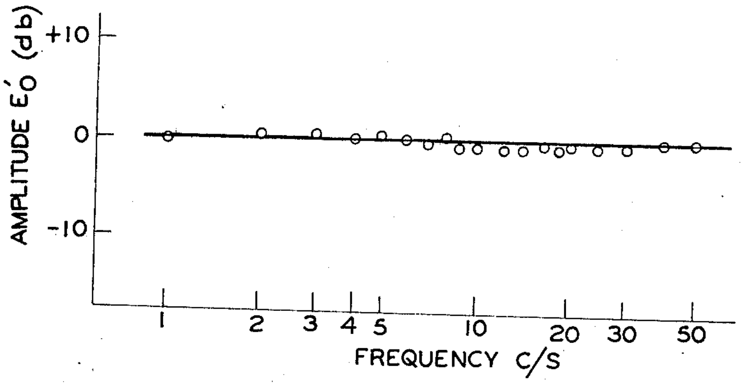
FIG. 13 is a frequency characteristic diagram showing one of the advantages of this invention.

FIG. 13 illustrates the frequency response characteristics of $E_o'$ in FIG. 9 obtained by the same procedure as described for FIG. 6. It shows the great improvement over FIG. 6. Due to instrumental limitations, measurements over 50 c./s. have not yet been performed. However, theoretically, it is quite obvious that a good (flat) characteristic curve can be expected over an extremely high frequency range.

As is clearly seen from the above illustration of the apparatus built in accordance with this invention, it enables a high precision measurement which cannot be expected from the conventional tracking system. The unique advantage which is considered to be inherent in this invention will be explained in more detail by way of example.

(1) An example of measuring displacement

Figure 14A:
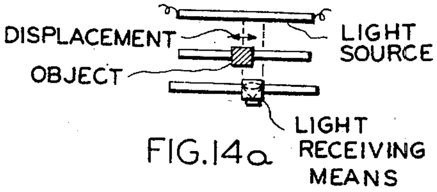
FIG. 14*a* is a diagram of a setup of an experiment for measuring displacement.

In FIG. 14*a*, in which a sketch of the set-up of the experiment is shown, the object to be tracked is interposed between the light source and the tracking means. For the purpose of this experiment, the object is the same structure as the tracking means however only the light receiving means is replaced by a cover plate.

Accordingly, the cover plate is manually movable in the lateral direction and the displacement thereof is detected by a potentiometer coupled therewith.

In this manner, various displacements (reciprocating movements) are intentionally given to the object in order to investigate the response characteristics and to analyze the measured results.

Figures 14B, 14C:
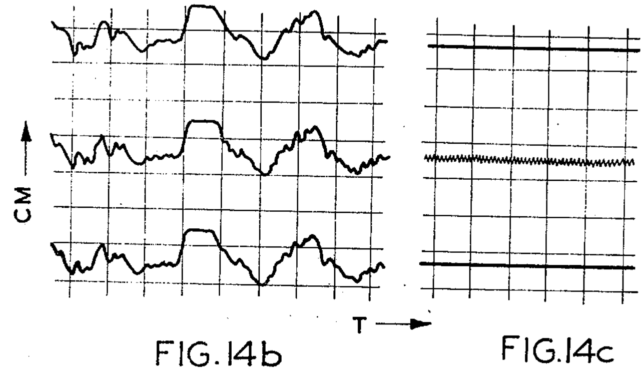
FIGS. 14*b* and *c* are diagrams illustrating the advantage of the correction of the error in the measurement of the displacement by the setup of FIG. 14*a*.

FIG. 14*b* shows the results of the comparison recorded by a pen-writing oscillograph. The upper portion of the chart represents the displacement given to the object and the bottom portion represents results measured by this method ($E_o'$ in FIG. 9). As a reference, the results of tracking by the light receiving means per se ($E_o$ in FIG. 9) are included in the middle portion of the chart.

As is clearly seen from these results, $E_o'$ reflects a more precise measurement of the displacement of the object than does $E_o$.

On the other hand, FIG. 14*c* shows the results obtained by an experiment in which adjustments were made to include hunting of the light receiving means. This causes a considerable degree of consequential hunting of $E_o$, and also indicates a good result of the $E_o'$ measurement in which the adverse effect of the hunting is almost completely removed.

(2) An example of measuring velocity

Figure 16:
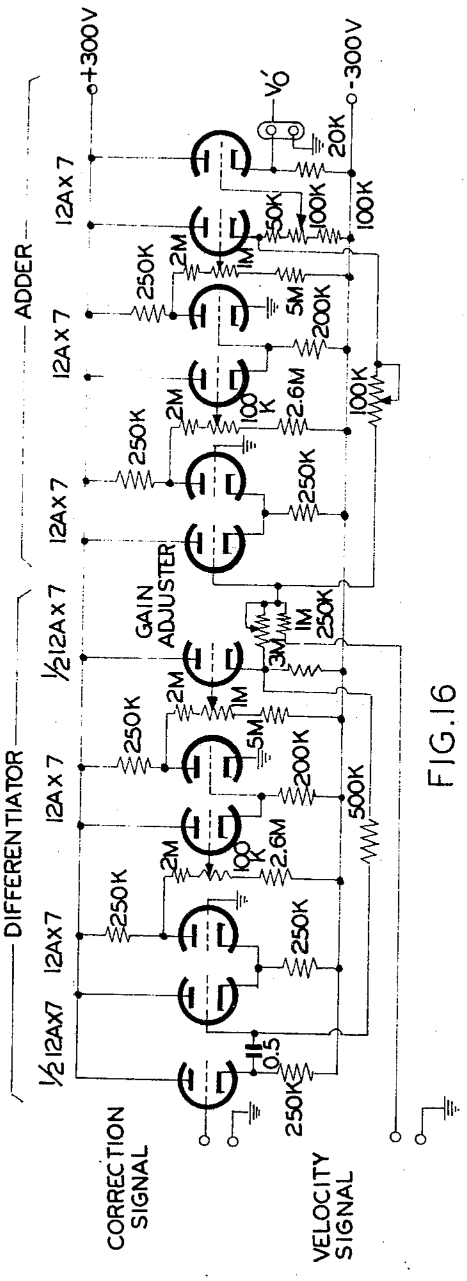
FIG. 16 is a partial circuit diagram of the apparatus illustrated in FIG. 15.
Figure 15:
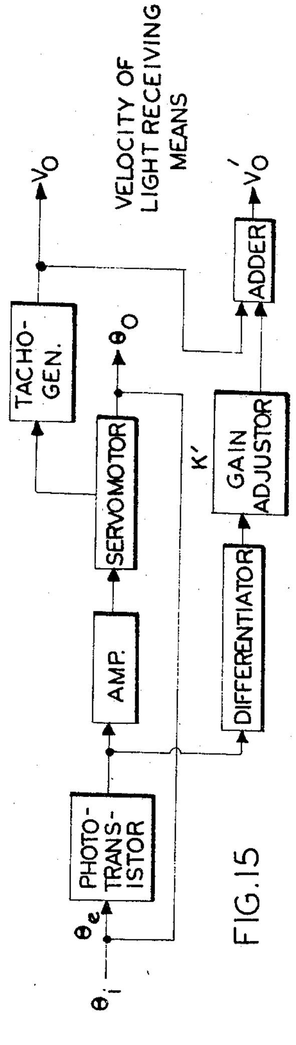
FIG. 15 is a schematic diagram illustrating an apparatus for measuring velocity.

The unique advantages of this invention will be more apparent after seeing the result of the velocity measurement. FIG. 15 is a schematic diagram of the apparatus for measuring velocity according to this invention and the circuit diagram thereof is illustrated in FIG. 16.

As previously described, the tracking velocity of the light receiving means can be detected by the tachogenerator (13 in FIG. 3) located on the tracking means. It therefore follows that a more precise result of the measurement can be obtained by correcting the tracking error.

The method of correction applicable here consists of converting the output voltage of the phototransistor into a velocity error component by means of a differentiator, and feeding this component into an adder through a gain adjuster This gain adjuster is set so as to establish the quantitative relationship of the optimum rate of correction in advance.

As seen in FIG. 15, the phototransistor is connected to the amplifier and servomotor in the same manner as in FIG. 9. However, the error signal $e_e$ is taken from the phototransistor and fed through a differentiator to a gain adjuster and thence to an adder. On the other hand, the output velocity signal $V_o$ of the tachogenerator is also fed to the adder. Thus the output of the adder is the velocity error corrected voltage $V_o'$.

The principal circuits for the differentiator and the adder of FIG. 16 consist of an operational amplifier. The correction signal $e_e$ is fed into the differentiator circuit through the correction signal input terminals. After being differentiated in said circuit, it is fed to the adder through the gain adjuster. On the the other hand, the velocity signal is also fed to said adder from the velocity signal terminals. The output, at the output terminals of the adder, is the velocity error corrected voltages $V_o'$.

Figures 17A, 17B, 17C:
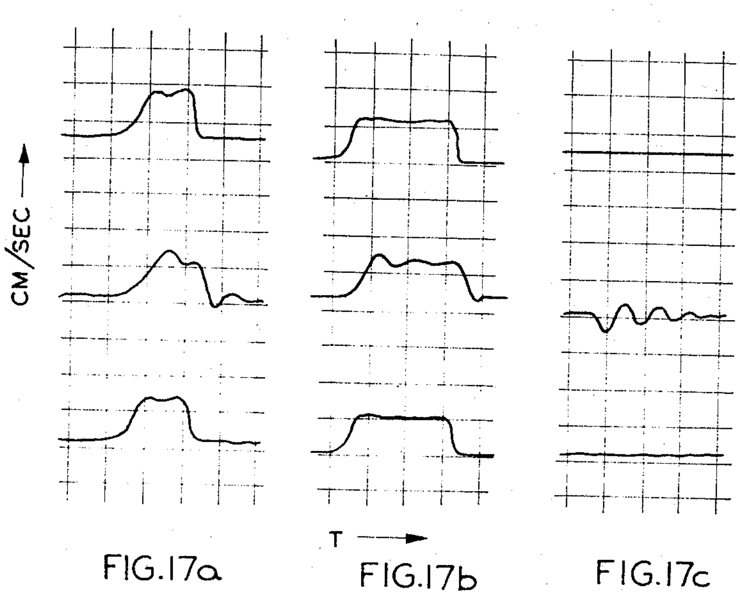
FIGS. 17*a*–17*c* are diagrams illustrating the advantage of the correction of the error in the measurement of the velocity.

The advantages of this method are then investigated by the same procedure as described in connection with FIG. 14*a*. FIG. 17*a* is an example of the results of the velocity measurements in the case where various movements are intentionally imparted to the object. The upper portion of the chart represents the actual velocity imparted to the object. The middle portion represents the results detected by the light receiving means per se ($V_o$ in FIG. 15) and the bottom portion represents the results of the measurements carried out according to this method ($V_o'$ in FIG. 15).

It is clearly seen from these results, that, while the results obtained by using the light receiving means per se exhibit a considerable delay and reflect the error caused by hunting, an accurate velocity is detected by employing the method of the invention to correct said errors. FIG. 17*b* shows the comparison in the case where a sudden increase and decrease of velocity are applied to the object (a rapid start and stop). As previously described, this indicates the prominent advantages of this method. FIG. 17*c* is appended for the purpose of supporting this prominent performance of correction. The experiment comprised holding the object in a stationary state followed by a releasing of the light receiving means which had previously been intentionally and manually held to prevent it from tracking in order to cause an oscillation of the light receiving means. The detected results indicate the almost perfect correction of the adverse effect of the hunting of the light receiving means.

(3) An example of measuring acceleration

Figure 18:
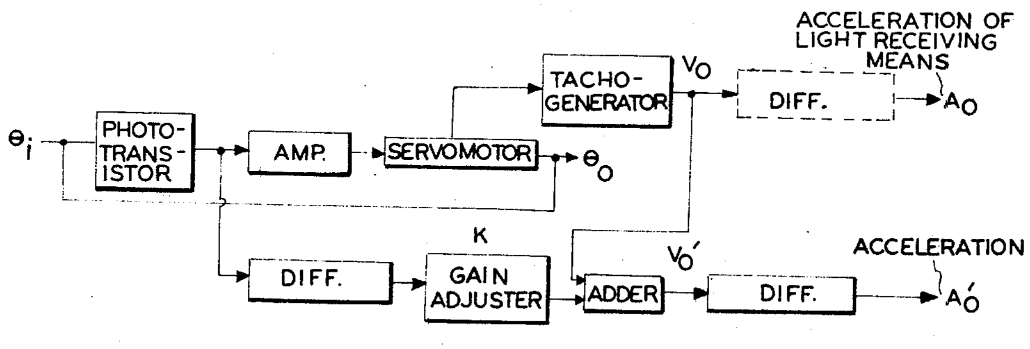
FIG. 18 is a schematic diagram of an apparatus for measuring acceleration.

Acceleration can be measured by applying a differential operation on the previously defined velocity signal. FIG. 18 is the schematic diagram and the circuit diagram is shown in FIG. 19.

The arrangement of the elements of the circuit of FIG. 18 is essentially the same as that in FIG. 15, except that a second differentiator is coupled to the output of the adder to differentiate the error corrected voltage $V_o'$ in order to produce an error corrected acceleration voltage $A_o'$. In order to provide a comparison of the acceleration voltage, an additional differentiator was added to the arrangement to differentiate the output voltage $V_o$ of the tachogenerator, this differentiator not forming part of the circuit of the persent invention and being shown in dotted lines.

Figure 19:
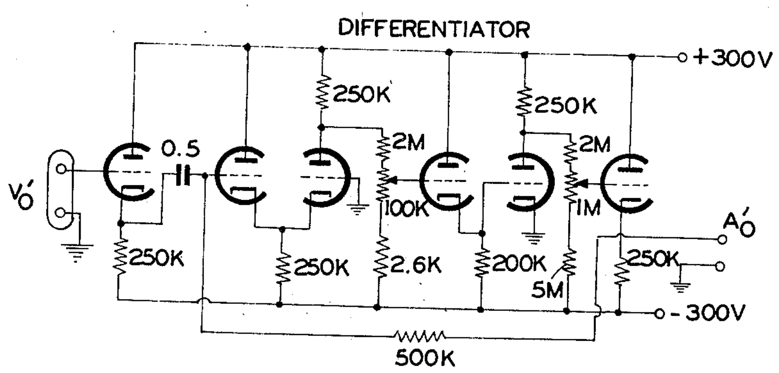
FIG. 19 is a partial circuit diagram of the apparatus illustrated in FIG. 18.

The circuit diagram of the differentiator used, is as shown in FIG. 19, and it will be seen that it is the same as the differentiator circuit forming part of FIG. 16.

Figures 20A, 20B, 20C, 20D:
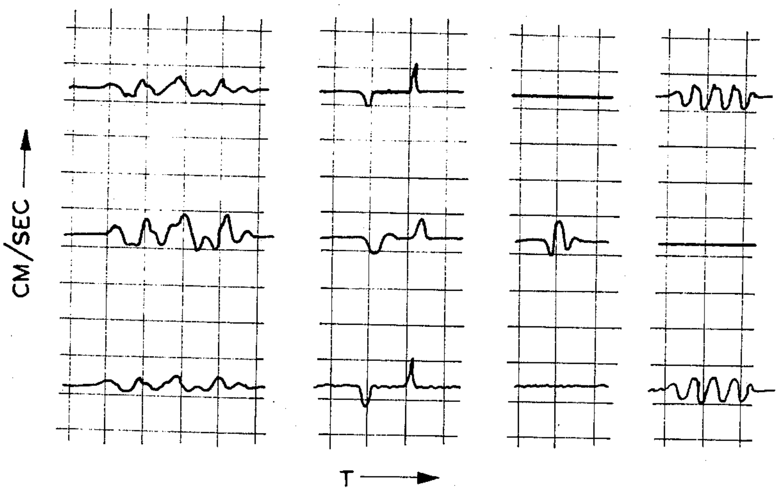
FIG. 20*a–d* are diagrams illustrating the advantages of the correction of the error in the measurement of acceleration.

The exemplified results of the experiment are shown in FIG. 20. The experiment was carried out in the same manner as described above. FIG. 20*a* represents a comparison in the case where various movements are applied to the object. FIG. 20*b* represents the comparison in the case where rapid starting and sudden stopping are imposed on the object. Since fine noises existing in the input signal will generally be enhanced by a differential operation, some noises will also appear in the results ($A_0'$) measured in accordance with this method. A good result can nevertheless be obtained as shown by a comparison with the acceleration of the object. FIG. 20*c* shows the results in the case where the object is held in a stationary state in which the light receiving means is subjected to an intentional hunting. It conspicuously indicates the advantages of this method. Furthermore FIG. 20*d* illustrates the results obtained in the case where fine displacements (reciprocating movements) are imposed on the object while it is in front of the light receiving means which is in a stationary state. It depicts the effect of the correcting function because a good acceleration signal is reflected by the method employing the correcting signal.

(4) An example of measuring distance moved

Figure 21:
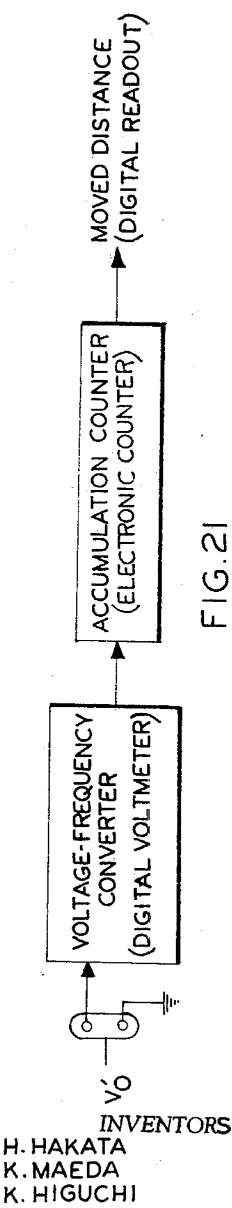
FIG. 21 is a schematic diagram of an apparatus for measuring the distance of the object's travel.

The total distance which the object moves in performing the various displacements (including reciprocating movements) can be obtained by integrating the previously-mentioned velocity signal ($V_o'$ in FIG. 15). FIG. 21 illustrates, by way of a schematic diagram, an example of system wherein the velocity signal voltage is converted into a pulse frequency by a voltage-frequency converter (digital voltmeter, commercially available as TR 6154 by Takeda Riken K.K.) and then is integrally counted by an electronic counter (electronic counter, commercially available as TR 5134 by Takeda Riken K.K.).

As an example, a comparison was made where the object traveled 30 cm. The experimental results indicate that there were counted values of the distances moved of:

140.7% of the real value, in the case employing the velocity signal without correction ($V_o$ in FIG. 15), and 100.8% of the real value, in the case employing the corrected velocity signal obtained in accordance with this method ($V_o'$ in FIG. 15).

This clearly indicates that this method is effective in suppressing the excessive counting caused by the hunting of the light receiving means.

It will be understood that the arrangements of FIGS. 9, 15, 18 and 21 can be combined into a single apparatus with the interconnections containing switches so that one or more measurements can be obtained simultaneously.

As has been described in the foregoing, the apparatus built according to this invention has enabled the detection of the movements of an object (displacement, velocity, acceleration and the distance moved) with a high degree of accuracy over a wide range. This invention has a wide application in the field of measurements, automatic control and so forth.

What is claimed is:

1. A photoelectric apparatus for tracking moving objects and measuring the displacement, velocity of movement, acceleration and total distance moved for such objects, said apparatus comprising an elongated light source, a light receiving means including a photoelectric element which produces a photoelectric current which varies linearly with the displacement of a moving object interposed between said light source and said receiving means, and tracking means on which said light receiving means is mounted, said tracking means including a driving means driving the tracking means, a servomotor coupled to said tracking means, an amplifier coupled to said servomotor, a voltage reference source, means to compare the voltage reference source with the voltage corresponding to the current produced by said photoelectric current means and coupled to said amplifier to feed the difference voltage to said amplifier for driving said servomotor to move the tracking means in a direction to track the moving object, means coupled to said servomotor for producing a voltage representative of the displacement of said tracking means from the object being tracked, and means coupled to said voltage producing means and to said photoelectric element for combining the signals produced thereby to produce an error corrected voltage output.

2. A photoelectric apparatus as claimed in claim 1 in which said combining means is an adder circuit.

3. A photoelectric apparatus as claimed in claim 1 in which a gain adjuster is coupled between said photoelectric element and said combining means.

4. A photoelectric apparatus as claimed in claim 1 in which said combining means is an adder, and said apparatus further comprises a gain adjuster coupled between said photoelectric element and said adder and a differentiator coupled between said gain adjuster and said photoelectric element, and a tachogenerator coupled to said servomotor.

5. A photoelectric apparatus as claimed in claim 4 further comprising a differentiator coupled to the output of said adder.

6. A photoelectric apparatus as claimed in claim 4 further comprising a voltage-frequency converter coupled to the output of said adder and an accumulation counter coupled to the output of said converter.

References Cited

UNITED STATES PATENTS

| | | | |
|---|---|---|---|
| 2,714,167 | 7/1955 | Herzog | 250—43.5 |
| 3,100,264 | 8/1963 | Jaffe | 250—203 |
| 3,389,250 | 6/1968 | Clemens | 250—43.5 |

JAMES W. LAWRENCE, Primary Examiner

E. R. LA ROCHE, Assistant Examiner

U.S. Cl. X.R.

250—234; 356—28